US011962414B2

United States Patent
Zhu

(10) Patent No.: US 11,962,414 B2
(45) Date of Patent: *Apr. 16, 2024

(54) METHOD AND APPARATUS FOR TRANSMITTING HARQ FEEDBACK INFORMATION, BASE STATION AND TERMINAL

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 571 days.

This patent is subject to a terminal disclaimer.

(21) Appl. No.: 17/266,510

(22) PCT Filed: Aug. 8, 2018

(86) PCT No.: PCT/CN2018/099479
§ 371 (c)(1),
(2) Date: Feb. 5, 2021

(87) PCT Pub. No.: WO2020/029147
PCT Pub. Date: Feb. 13, 2020

(65) Prior Publication Data
US 2021/0306104 A1  Sep. 30, 2021

(51) Int. Cl.
*H04L 1/1812* (2023.01)
*H04L 1/00* (2006.01)
(Continued)

(52) U.S. Cl.
CPC .......... *H04L 1/1812* (2013.01); *H04W 72/23* (2023.01)

(58) Field of Classification Search
CPC ... H04L 1/1812; H04L 1/1854; H04L 1/1864; H04L 1/1822; H04L 2001/0093;
(Continued)

(56) References Cited

U.S. PATENT DOCUMENTS

2010/0275083 A1* 10/2010 Nam ................. H03M 13/6306
714/E11.131
2017/0201932 A1* 7/2017 Yeh ....................... H04L 5/0055
(Continued)

FOREIGN PATENT DOCUMENTS

| CN | 103516496 A | 1/2014 |
| CN | 103973397 A | 8/2014 |

(Continued)

OTHER PUBLICATIONS

First Office Action issued to Chinese Application No. 201880001648.7 dated Sep. 27, 2020 with English translation, (18p).
(Continued)

*Primary Examiner* — Harry H Kim
(74) *Attorney, Agent, or Firm* — Arch & Lake LLP

(57) ABSTRACT

The present disclosure provides methods and apparatuses for transmitting HARQ feedback information, base stations and terminals. The method includes: determining downlink Hybrid Automatic Repeat reQuest (HARQ) configuration information, where the downlink HARQ configuration information informs at least two preset terminals about transmission configuration information of target downlink control signaling; sending the downlink HARQ configuration information to each of the preset terminals; loading the downlink HARQ feedback information for each of the preset terminals into the target downlink control signaling according to the downlink HARQ configuration information; and sending the target downlink control signaling to each of the preset terminals. In the present disclosure, the base station transmits HARQ feedback information with respect to uplink data transmission from a plurality of terminals through the target downlink control signaling, which saves system signaling overhead.

12 Claims, 10 Drawing Sheets

(51) Int. Cl.
    *H04L 1/1806*    (2023.01)
    *H04L 1/1822*    (2023.01)
    *H04L 1/1829*    (2023.01)
    *H04L 1/1867*    (2023.01)
    *H04W 72/23*    (2023.01)

(58) Field of Classification Search
    CPC ... H04L 1/1896; H04L 1/1607; H04L 1/1806; H04W 72/23
    See application file for complete search history.

(56) References Cited

U.S. PATENT DOCUMENTS

| | | | | |
|---|---|---|---|---|
| 2021/0167930 | A1* | 6/2021 | Jeon | H04L 27/2607 |
| 2021/0297222 | A1* | 9/2021 | Zhu | H04L 5/0055 |

FOREIGN PATENT DOCUMENTS

| | | | |
|---|---|---|---|
| CN | 105634689 | A | 6/2016 |
| CN | 105764144 | A | 7/2016 |
| CN | 106301699 | A | 1/2017 |
| CN | 106301700 | A | 1/2017 |
| CN | 107359969 | A | 11/2017 |
| WO | 2013151473 | A1 | 10/2013 |
| WO | 2018098778 | A1 | 6/2018 |

OTHER PUBLICATIONS

International Search Report of PCT Application No. PCT/CN2018/099479 dated May 9, 2019 with English translation (6p).

European Patent Office, Extended European Search Report Issued in Application No. 18929680.9, dated Sep. 10, 2021, Germany, 14 pages.

ISA State Intellectual Property Office of the People's Republic of China, Written Opinion of the International Searching Authority Issued in Application No. PCT/CN2018/099479, dated May 9, 2019, WIPO, 8 pages.

Samsung, "Group DCI for uplink HARQ-ACK feedback", 3GPP TSG RAN WG1 Meeting #92bis Sanya, China, R1-1804327, Apr. 16-20, 2018, 8 pages.

Huawei, HiSilicon, "On HARQ-ACK feedback for PUSCH in eFeMTC", 3GPP TSG RANG WGI Meeting #90bis Prague, Czech Republic, RI-1716971, Oct. 9-13, 2017, 6 pages.

Huawei, HiSilicon, "Further considerations on HARQ-ACK feedback for PUSCH in eFeMTC", 3GPP TSG RAN WG 1 Meeting #91 Reno, USA, RI-1719464, Nov. 27-Dec. 1, 2017, 6 pages.

Intellectual property India, Office Action Issued in Application No. 202147008961, dated Jan. 27, 2022, (5 pages). (Submitted with Partial Machine Translation).

* cited by examiner

METHOD AND APPARATUS FOR TRANSMITTING HARQ FEEDBACK INFORMATION, BASE STATION AND TERMINAL

CROSS REFERENCE TO RELATED APPLICATIONS

The present application is the U.S. national phase of PCT Application No. PCT/CN2018/099479 filed on Aug. 8, 2018, which is incorporated herein by reference in its entirety for all purposes.

TECHNICAL FIELD

The present disclosure relates to the field of communication technology, and in particular, to a method and apparatus for transmitting HARQ feedback information, a base station and a terminal.

BACKGROUND

In a wireless communication system, due to time-varying characteristics of a wireless channel and influence of multipath fading, signal transmission will be affected, leading to failure of data transmission. To solve this problem, an HARQ (Hybrid Automatic Repeat reQuest) mechanism is introduced into a wireless communication system. A receiver side provides feedback on the correctness of data reception using HARQ feedback information, i.e., an ACK signal or a NACK signal. A transmitter side determines, according to the HARQ feedback information, whether the transmitter needs to re-send a data packet that has been sent. In a traditional LTE (Long Term Evolution) system, there is a timing relationship between the time of data transmission and the time of ACK/NACK feedback. Limited by processing capability of a terminal, in the LTE system, there is at least 4 ms between the time of data transmission and the time of ACK/NACK feedback.

With the development of wireless communication technology, a mobile communication network is gradually evolved to a 5G NR (New Radio) network. The new generation communication network can already support a flexible HARQ feedback mechanism. For HARQ feedback of uplink data transmission, the base station can indicate whether the already transmitted uplink data needs to be retransmitted through a scheduling command. However, using one piece of scheduling signaling to carry each HARQ feedback information, signaling overhead is relatively large. In addition, for a communication system operating on an unlicensed spectrum, due to the uncertainty of channel occupancy, there may exist the case where the base station has to transmit HARQ feedback information for multiple uplink data transmissions of one terminal on the same transmission unit. In this case, it is not appropriate to use separate scheduling signaling to carry each HARQ feedback information.

SUMMARY

To overcome the problems existing in the related art, examples of the present disclosure provide methods and apparatuses for transmitting HARQ feedback information, base stations and terminals. The base station can transmit HARQ feedback information with respect to uplink data transmission from a plurality of terminals through target downlink control signaling, which saves system signaling overhead.

According to a first aspect of the present disclosure, a method of transmitting downlink HARQ feedback information is provided. The method is applicable to a base station, and includes:
  determining downlink Hybrid Automatic Repeat reQuest (HARQ) configuration information, where the downlink HARQ configuration information informs at least two preset terminals about transmission configuration information of target downlink control signaling, the target downlink control signaling carries pieces of downlink HARQ feedback information for the at least two preset terminals, and a piece of the downlink HARQ feedback information is HARQ feedback information with respect to uplink data transmission from a terminal;
  sending the downlink HARQ configuration information to each of the preset terminals; and
  loading the downlink HARQ feedback information for each of the preset terminals into the target downlink control signaling according to the downlink HARQ configuration information, and sending the target downlink control signaling to each of the preset terminals.

According to a second aspect of the present disclosure, a method of transmitting downlink HARQ feedback information is provided. The method is applicable to a terminal, and includes:
  receiving downlink Hybrid Automatic Repeat reQuest (HARQ) configuration information from a base station, where the downlink HARQ configuration information informs the terminal about transmission configuration information of target downlink control signaling, the target downlink control signaling carries pieces of downlink HARQ feedback information for at least two preset terminals, and a piece of the downlink HARQ feedback information is HARQ feedback information with respect to uplink data transmission from a terminal;
  obtaining identification information of the target downlink control signaling and configuration information of information fields according to the downlink HARQ configuration information;
  detecting the target downlink control signaling according to the identification information;
  determining a location of a target information field from the target downlink control signaling according to the configuration information of the information fields; and
  obtaining HARQ feedback information with respect to target uplink data transmission from the location of the target information field.

According to a third aspect of the present disclosure, an apparatus for transmitting downlink HARQ feedback information is provided. The apparatus is disposed in a base station, and includes:
  a configuration information determining module configured to determine downlink Hybrid Automatic Repeat reQuest (HARQ) configuration information, where the downlink HARQ configuration information informs at least two preset terminals about transmission configuration information of target downlink control signaling, the target downlink control signaling carries pieces of downlink HARQ feedback information for the at least two preset terminals, and a piece of the downlink HARQ feedback information is HARQ feedback information with respect to uplink data transmission from a terminal;
a sending module configured to send the downlink HARQ configuration information to each of the preset terminals; and
an HARQ feedback module configured to the downlink HARQ feedback information for each of the preset terminals into the target downlink control signaling according to the downlink HARQ configuration information, and the target downlink control signaling to each of the preset terminals.

According to a fourth aspect of the present disclosure, an apparatus for transmitting downlink HARQ feedback information is provided. The apparatus is disposed in a terminal, and includes:
a configuration information receiving module configured to receive downlink Hybrid Automatic Repeat reQuest (HARQ) configuration information from a base station, where the downlink HARQ configuration information informs the terminal about transmission configuration information of target downlink control signaling, the target downlink control signaling carries pieces of downlink HARQ feedback information for at least two preset terminals, and a piece of the downlink HARQ feedback information is HARQ feedback information with respect to uplink data transmission from a terminal;
an information obtaining module configured to obtain identification information of the target downlink control signaling and configuration information of information fields according to the downlink HARQ configuration information;
a detecting module configured to detect the target downlink control signaling according to the identification information;
an information field determining module configured to determine a location of a target information field from the target downlink control signaling according to the configuration information of the information fields; and
an analyzing module configured to obtain HARQ feedback information with respect to target uplink data transmission from the location of the target information field.

According to a fifth aspect of the present disclosure, a non-transitory computer readable storage medium is provided, the storage medium has computer instructions stored thereon, where the instructions are executed by a processor to implement the steps in any one of methods according to the first aspect.

According to a sixth aspect of the present disclosure, a non-transitory computer readable storage medium is provided, the storage medium has computer instructions stored thereon, where the instructions are executed by a processor to implement the steps in any one of methods according to the second aspect.

According to a seventh aspect of the present disclosure, a base station is provided. The base station includes: a processor, and a memory for storing instructions executable by the processor. The processor is configured to:
determine downlink Hybrid Automatic Repeat reQuest (HARQ) configuration information, where the downlink HARQ configuration information informs at least two preset terminals about transmission configuration information of target downlink control signaling, the target downlink control signaling carries pieces of downlink HARQ feedback information for the at least two preset terminals, and a piece of the downlink HARQ feedback information is HARQ feedback information with respect to uplink data transmission from a terminal;
send the downlink HARQ configuration information to each of the preset terminals; and
load the downlink HARQ feedback information for each of the preset terminals into the target downlink control signaling according to the downlink HARQ configuration information, and send the target downlink control signaling to each of the preset terminals.

According to an eighth aspect of the present disclosure, a terminal is provided. The terminal includes: a processor, and a memory for storing instructions executable by the processor. The processor is configured to:
receive downlink Hybrid Automatic Repeat reQuest (HARQ) configuration information from a base station, where the downlink HARQ configuration information informs the terminal about transmission configuration information of target downlink control signaling, the target downlink control signaling carries pieces of downlink HARQ feedback information for at least two preset terminals, and a piece of the downlink HARQ feedback information is HARQ feedback information with respect to uplink data transmission from a terminal;
obtain identification information of the target downlink control signaling and configuration information of information fields according to the downlink HARQ configuration information;
detect the target downlink control signaling according to the identification information;
determine a location of a target information field from the target downlink control signaling according to the configuration information of the information fields; and
obtain HARQ feedback information with respect to target uplink data transmission from the location of the target information field.

It should be understood that the above general description and the following detailed description are only exemplary and explanatory and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
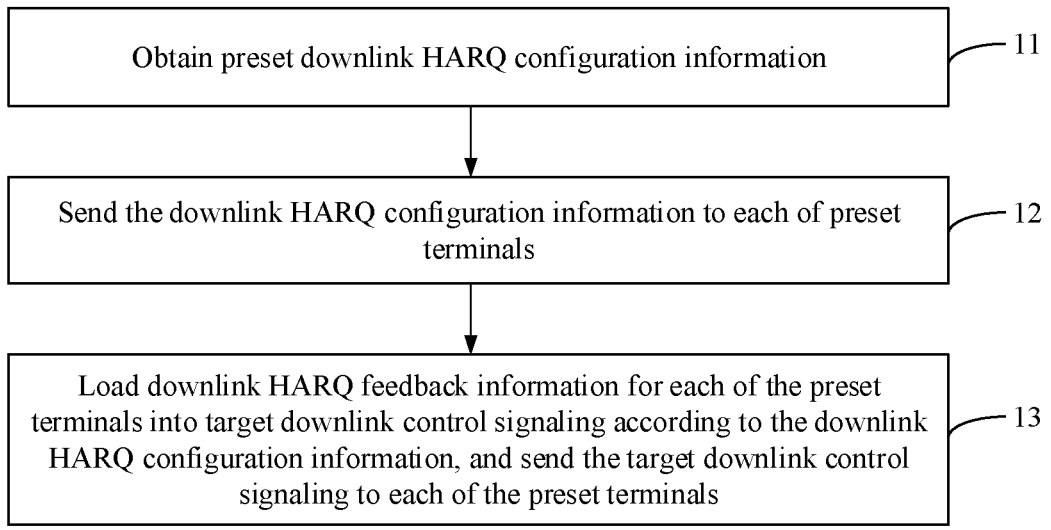
FIG. 1 is a flowchart illustrating a method of transmitting HARQ feedback information according to an example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining".

Executive entities involved in the present disclosure include: a base station and a terminal. The base station may be a base station, a sub-base station, etc., which are set up with a large-scale antenna array. The terminal may be user equipment (UE), a user node, a mobile terminal, a tablet computer, or the like. In a specific implementation, the base station and the terminal are independent of each other and at the same time interconnected to jointly realize the technical solution provided by the present disclosure.

FIG. 1 is a flowchart illustrating a method of transmitting HARQ feedback information according to an example. The method is applied to a base station, and includes the following steps.

At step 11, preset downlink HARQ configuration information is determined. The preset downlink HARQ configuration information is used to inform at least two preset terminals about transmission configuration information of target downlink control signaling. The target downlink control signaling is used to carry pieces of downlink HARQ feedback information for the at least two preset terminals. A piece of the downlink HARQ feedback information is HARQ feedback information with respect to uplink data transmission from a terminal.

In the present disclosure, the base station may design target downlink control signaling for a group of terminals, and the group of terminals includes at least two terminals. The target downlink control signaling is used to carry downlink HARQ feedback information for the at least two terminals. The downlink HARQ feedback information is HARQ feedback information sent by the base station according to an information reception status of uplink data transmission from a terminal. The downlink HARQ feedback information includes an acknowledgement, ACK, signal and a negative acknowledgement, NACK, signal.

That is, a plurality of information fields may be set in the target downlink control signaling, and each information field is used to carry downlink HARQ feedback information for a terminal. One information field, depending on the number of pieces of uplink data transmission that have been sent by the terminal, may carry HARQ feedback information with respect to one or more uplink data transmission.

In the present disclosure, downlink HARQ configuration information includes identification information of the target downlink control signaling and configuration information of information fields.

The identification information of the target downlink control signaling is used to inform each preset terminal about how to identify the target downlink control signaling. For example, the identification information may be a common HARQ-RNTI (Radio Network Temporary Identifier) value for the group of terminals.

The configuration information of the information fields is used to instruct each preset terminal to search for a corresponding target information field from the target downlink control signaling.

In another example of the present disclosure, downlink HARQ configuration information may further include a transmission time/frequency location of the target downlink control signaling, a CCE (Control Channel Element) aggregation level of the target downlink control signaling, and so on, such that each preset terminal may quickly detect the target downlink control signaling from a control region of a transmission unit for the target downlink control signaling in accordance with resources of the transmission time/frequency location and a preset CCE aggregation level, e.g., 8, which improves the detection efficiency of the target downlink control signaling.

Figure 2:
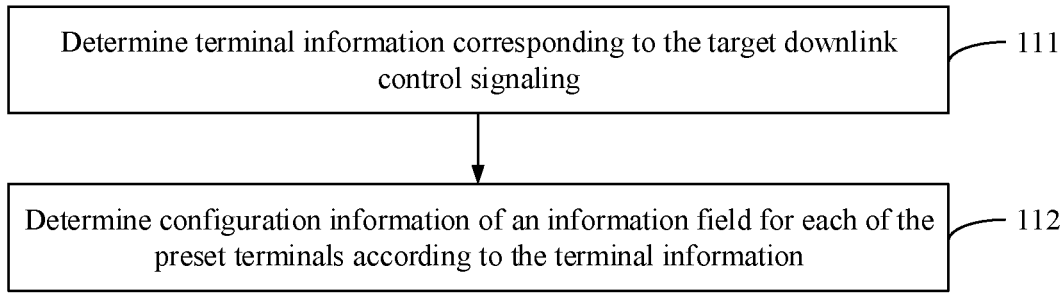
FIG. 2 is a flowchart illustrating another method of transmitting HARQ feedback information according to an example of the present disclosure.

With respect to how the base station determines the downlink HARQ configuration information, reference may be made to a flowchart illustrating another method of transmitting HARQ feedback information shown in FIG. 2 according to an example, and step 11 may include the following.

At step 111, terminal information corresponding to the target downlink control signaling is determined. The terminal information includes at least: a terminal identifier of each of the preset terminals.

In the present disclosure, the base station may select at least two terminals that share one piece of target downlink control signaling from a plurality of terminals accessing a cell according to a preset rule. The preset rule may be to determine a preset number of terminals belonging to the same device type as a group of terminals, or, to determine a plurality of terminals whose distances from each other fall within a preset distance range as a group of terminals according to a distance between terminals.

In another example of the present disclosure, the base station may instruct all terminals in a cell to share one piece of target downlink control signaling to transmit downlink HARQ feedback information.

At step 112, configuration information of an information field for each of the preset terminals is determined according to the terminal information.

The configuration information of the information field indicates a location of an HARQ feedback information field associated with a terminal in the target downlink control signaling. The preset terminal may determine a location of its own target information field in the target downlink control signaling according to the configuration information of the information fields.

In the present disclosure, when configuring the information fields in the target downlink control signaling, the base station may set a corresponding information field for each preset terminal, or set a corresponding information field only for a preset terminal that requires HARQ feedback on a transmission unit currently transmitting the target downlink control signaling.

Figure 3:
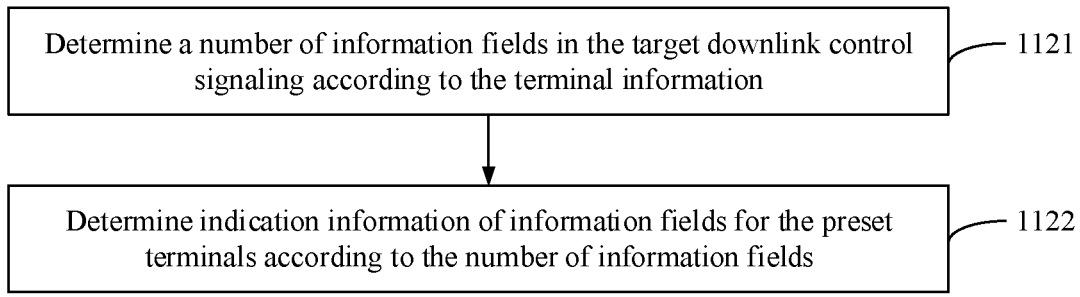
FIG. 3 is a flowchart illustrating another method of transmitting HARQ feedback information according to an example of the present disclosure.

Referring to FIG. 3, which is a flowchart illustrating another method of transmitting HARQ feedback information according to an example, step 112 may include the following.

At step 1121, a number of information fields in the target downlink control signaling is determined according to the terminal information.

In the present disclosure, according to timing of sending the downlink HARQ configuration information to each terminal, the implementation of step 1121 may include two cases. Four preset terminals sharing one piece of target downlink control signaling will be taken as an example for illustration. It is assumed that terminal identifiers of the four preset terminals are: UE 1, UE 2, UE 3, and UE 4 respectively.

In a first case, a corresponding information field is configured for each of the terminal identifiers, and the number of information fields is determined.

As in the above example, the base station provides four information fields in the target downlink control signaling, regardless of whether HARQ feedback is sent for a preset terminal on a transmission unit currently transmitting the target downlink control signaling.

In a second case, the number of information fields is determined according to the terminal identifier of each preset terminal and target uplink data transmission associated with HARQ feedback to be sent currently. That is, the base station sets a corresponding information field only for each preset terminal that needs to send HARQ feedback on the transmission unit currently transmitting the target downlink control signaling.

It is assumed that current time is t1. According to a system protocol, the base station needs to send HARQ feedback for target uplink data transmission before a preset HARQ feedback period, such as 4 ms. If UE 4 does not send uplink data to the base station, the base station needs to carry HARQ feedback information with respect to uplink data transmission from UE 1, UE 2, and UE 3 in current target downlink control signaling. The base station may set three information fields for UE 1, UE 2, and UE 3 according to actual needs.

In this case, a corresponding information field may not be configured for a preset terminal that does not need HARQ feedback, which saves resources.

At step 1122, indication information of the information fields for the preset terminals is determined according to the number of information fields. The indication information of the information fields is used to inform UE about a location of its own target information field in the target downlink control signaling and an information length of the target information field.

Figure 4:
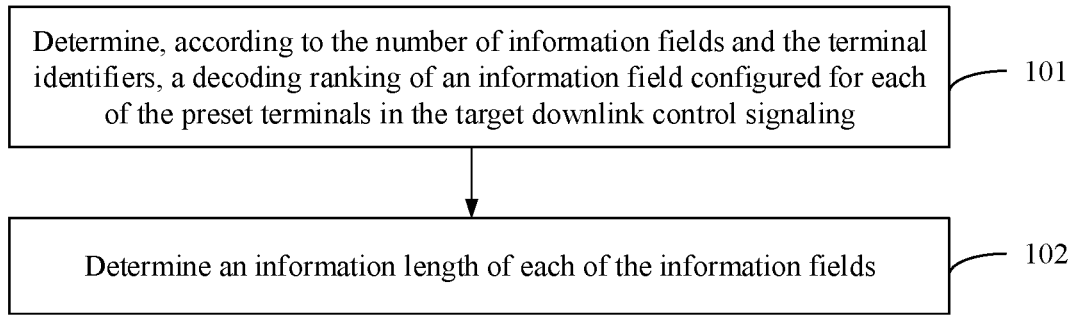
FIG. 4 is a flowchart illustrating another method of transmitting HARQ feedback information according to an example of the present disclosure.

Referring to FIG. 4, which is a flowchart illustrating another method of transmitting HARQ feedback information according to an example, step 1122 may include the following.

At step 101, a decoding ranking of an information field configured for each of the preset terminals in the target downlink control signaling is determined according to the number of information fields and the terminal identifiers.

On the basis of determining the number of information fields included in the target downlink control signaling, the base station may determine a decoding order for information fields associated with respective preset terminals in the target downlink control signaling according to a preset rule.

For example, for the first case described above, the base station may determine, according to device types of the preset terminals, latency sensitive characteristics of the terminals, and then allocate a corresponding information field to each preset terminal in an order from front to rear according to an order of the latency sensitive characteristics of the preset terminals from strong to weak.

It is assumed that UE 1 and UE 4 belong to URLLC (Ultra Reliable Low Latency Communication) devices, UE 2 belongs to an mMTC (massive Machine Type Communication) device, and UE 3 belongs to an eMBB (enhanced Mobile Broad Band) device. Different types of devices have different requirements for data latency sensitivity, for example, an URLLC device is used in a field such as the Internet of Vehicles that requires low latency and high timeliness, an mMTC device is usually not sensitive to latency, and an eMBB device has latency sensitivity between the URLLC device and the mMTC device.

If information fields are arranged as 1, 2, 3, and 4 in a decoding order from front to rear in the target downlink control signaling, correspondence among terminal identifier, information field identifier and device type in this example may be as shown in Table 1.

TABLE 1

| Terminal ID | Device type | Information field ID |
|---|---|---|
| UE 1 | URLLC | 1 |
| UE 4 | URLLC | 2 |
| UE 3 | eMBB | 3 |
| UE 2 | mMTC | 4 |

Figure 5A:
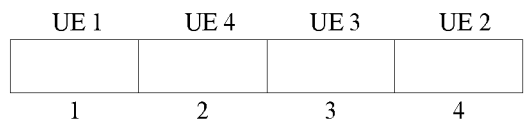
FIGS. 5A to 5C are schematic diagrams illustrating an application scenario in which HARQ feedback information is transmitted according to an example of the present disclosure.

Correspondingly, a schematic diagram of information field configuration for these terminals determined according to Table 1 is shown in FIG. 5A.

In another example, the base station may determine a decoding ranking of an information field associated with each preset terminal in the target downlink control signaling according to a service type of target uplink data transmission from the terminal. The target uplink data transmission refers to uplink data transmission that HARQ feedback information related to the uplink data transmission is carried in current target downlink control signaling.

For example, corresponding to the second case described above, UE 4 does not perform uplink data transmission, a service type corresponding to target uplink data transmission from UE 1 is a URLLC service, a service type corresponding to target uplink data transmission from UE 2 is an mMTC service, and a service type corresponding to target uplink data transmission from UE 3 is an eMBB service.

In this example, correspondence among terminal identifier, information field identifier and service type may be as shown in Table 2.

TABLE 2

| Terminal ID | Service types | Information field ID |
|---|---|---|
| UE 1 | URLLC | 1 |
| UE 3 | eMBB | 2 |
| UE 2 | mMTC | 3 |

Figure 5B:
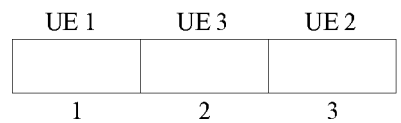

Correspondingly, a schematic diagram of information field configuration for these terminals determined according to Table 2 is shown in FIG. 5B.

In another example of the present disclosure, the base station may randomly configure a location of an information field for each terminal, as shown in Table 3.

TABLE 3

| Terminal ID | Information field ID |
|---|---|
| UE 1 | 1 |
| UE 2 | 2 |
| UE 3 | 3 |
| UE 4 | 4 |

Figure 5C:
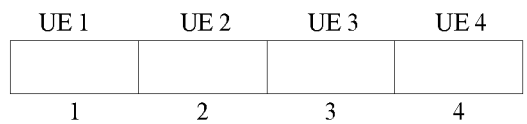

Correspondingly, a schematic diagram of information field configuration of these terminals determined according to Table 3 is shown in FIG. 5C.

At step 102, an information length of each of the information fields is determined.

In an example of the present disclosure, on the basis of determining the decoding ranking of an information field for each preset terminal, the base station further determines the information length of each information field.

It should be noted that in the present disclosure, steps 101 and 102 may be performed simultaneously, or step 102 may be performed first and then step 101. There is no particular order for performing these two steps.

In the present disclosure, any of the following approaches may be used to configure an information length for an information field of one preset terminal.

In a first approach, an identical information length is configured for each information field.

Figure 6A:
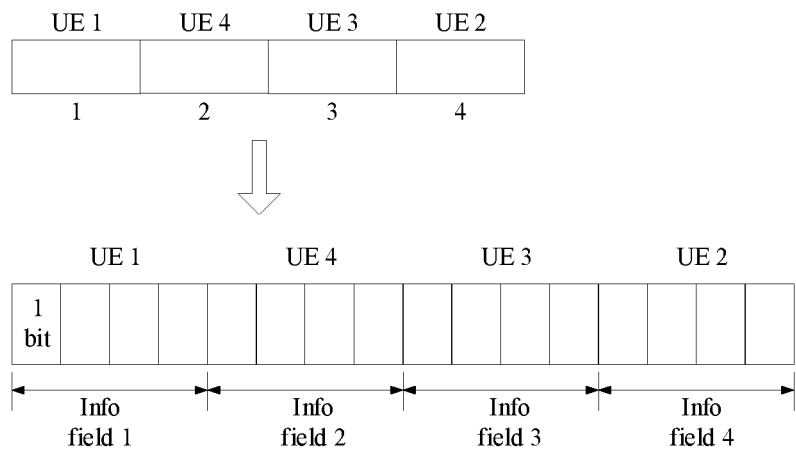
FIGS. 6A to 6C are schematic diagrams illustrating another application scenario in which HARQ feedback information is transmitted according to an example of the present disclosure.

In the present disclosure, the base station may configure an information field with the same length for each preset terminal, which saves signaling overhead for informing each preset terminal about its information field length. Still taking the first case as an example, corresponding to a structural schematic diagram of information fields shown in FIG. 5A, the base station may configure the information field of each UE with the identical information length, for example, 4 bits, as shown in FIG. 6A.

In a second approach, information field lengths configured for the preset terminals are determined according to device capability information of the preset terminals. The device capability information includes information on support capability of a preset terminal for an HARQ feedback process.

In another example of the present disclosure, the base station may obtain the device capability information of each preset terminal, and dynamically adjust the information length of each information field according to the device capability information of each preset terminal, thereby dynamically adjusting an information length of the target downlink control signaling. Device capability information of a preset terminal may include a maximum number of HARQ feedback processes supported by the preset terminal, and the device capability information may further include a memory size of the preset terminal, a data processing capability of the preset terminal, and so on.

Figure 6B:
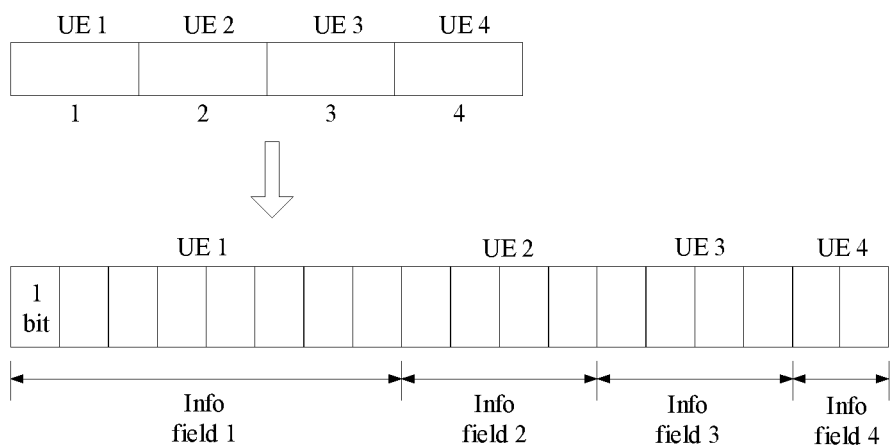

Exemplarily, if the base station determines an information length of an information field with reference primarily to information on support capability of a preset terminal for an HARQ feedback process, for example, a maximum number of HARQ feedback processes supported by the preset terminal. The information length of the information field may also be referred to as an information field length for short. Corresponding to the example shown in FIG. 5C, if UE 1 can support up to 8 HARQ feedback processes simultaneously, UE 2 and UE 3 can support up to 4 HARQ feedback processes simultaneously, and UE 4 can support up to 2 HARQ feedback processes simultaneously, the base station may configure information field lengths for UE 1, UE 2, UE 3, and UE 4 as: 8 bits, 4 bits, 4 bits, and 2 bits respectively, as shown in FIG. 6B.

The approaches of configuring an information field length illustrated in the first and second approaches may be applicable to the first and second cases above.

In a third approach, information field lengths configured for the preset terminals are dynamically determined according to a number of pieces of target uplink data transmission for each preset terminal.

Figure 6C:
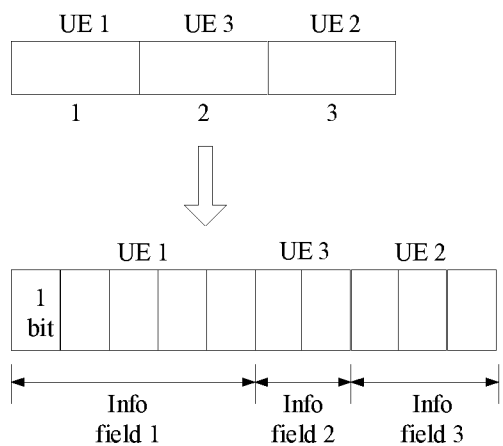

The third approach is mainly applicable to the second case above. It is assumed that the base station needs to send HARQ feedback for 5 pieces of uplink data transmission from UE 1, 3 pieces of uplink data transmission from UE 2 and 2 pieces of uplink data transmission from UE 3 in the current target downlink control signaling. On the basis of the example shown in FIG. 5B, the base station may set an information length of information field 1 configured for UE 1 to 5 bits, an information length of information field 2 configured for UE 3 to 2 bits, and an information length of information field 3 configured for UE 2 to 3 bits, as shown in FIG. 6C.

Using the third approach to set the length information of each information field, each information field length may be accurately configured in the current target downlink control signaling according to the number of pieces of target uplink data transmission from each preset terminal, which realizes dynamically configuring an information length of the target downlink control signaling and avoids waste of resources.

At step 12, the downlink HARQ configuration information is sent to each of the preset terminals.

In the present disclosure, the base station may send the downlink HARQ configuration information to each preset terminal at different moments depending on the way the configuration information of the information fields is determined.

Corresponding to the first case above, the base station may send the downlink HARQ configuration information to each preset terminal before the preset terminal sends uplink data.

Corresponding to the second case above, the base station may send the downlink HARQ configuration information to a target preset terminal before sending downlink HARQ feedback information in the target downlink control signaling. The target preset terminal refers to a preset terminal that requires HARQ feedback on a transmission unit currently transmitting the target downlink control signaling.

In addition, information included in the downlink HARQ configuration information, such as identification information of the target downlink control signaling, configuration information of information fields, and a transmission time/frequency location of the target downlink control signaling, a CCE aggregation level of the target downlink control signaling, and the like, may be sent to preset terminals through one or more signaling. The signaling may include: multicast signaling, upper layer signaling, physical layer signaling such as a PDCCH (Physical Downlink Control Channel) signaling, etc. The upper layer signaling may be RRC (Radio Resource Control) signaling, or MAC (Medium Access Control) CE (Control Element) signaling. In another example of the present disclosure, part of the information in the downlink HARQ configuration information, for example, the transmission time/frequency location of the target downlink control signaling, the CCE aggregation level of the target downlink control signaling, or the like, may be specified by a system protocol, in which case the base station does not need to spend additional signaling overhead to notify the terminal about this information.

At step 13, downlink HARQ feedback information for each of the preset terminals is loaded into target downlink control signaling according to the downlink HARQ configuration information, and the target downlink control signaling is sent to each of the preset terminals.

Figure 7:
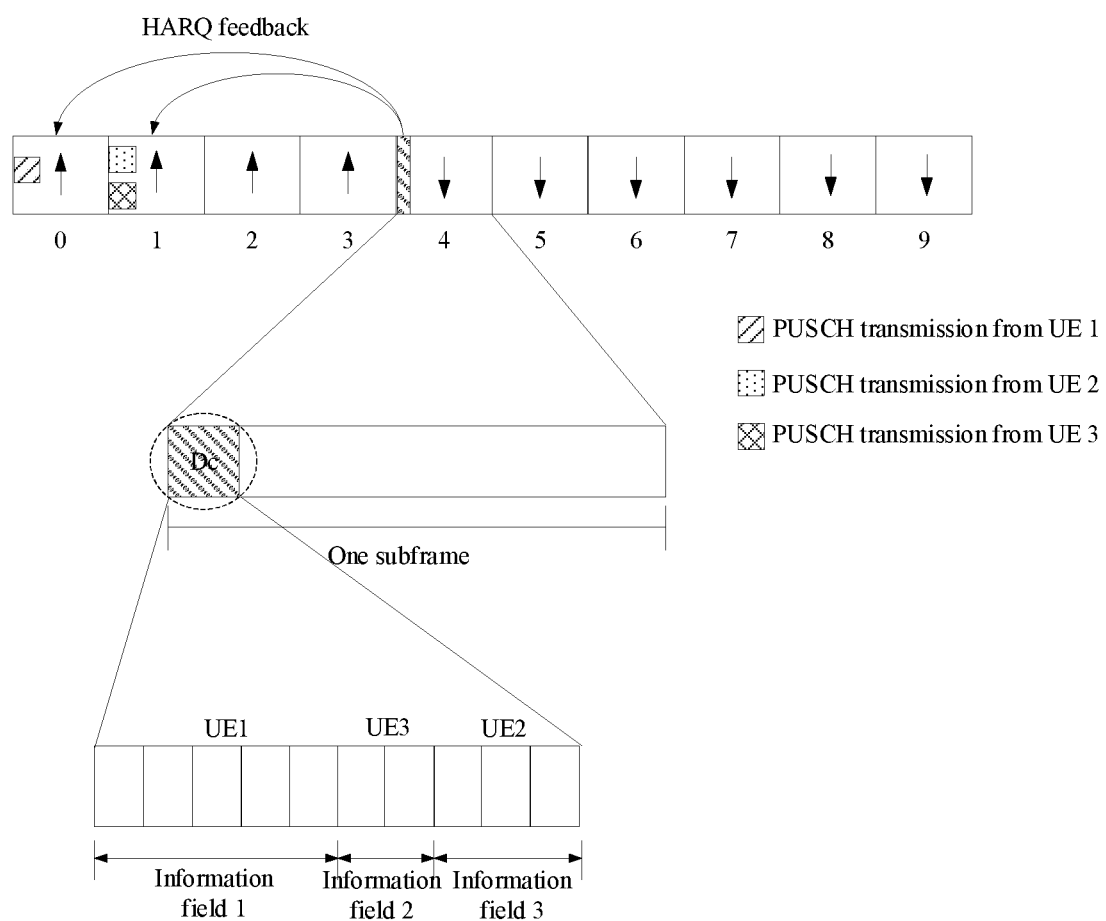
FIG. 7 is a schematic diagram illustrating another application scenario in which HARQ feedback information is transmitted according to an example of the present disclosure.

Referring to FIG. 7, which is a schematic diagram illustrating an application scenario in which HARQ feedback information is transmitted according to an example. Still assuming that the base station needs to send HARQ feedback for 5 pieces of target uplink data transmission from UE 1, i.e., transmission on a PUSCH (Physical Uplink Shared Channel), 3 pieces of target uplink data transmission from UE 2 and 2 pieces of target uplink data transmission from UE 3 in current target downlink control signaling, the base station may load HARQ feedback information with respect to each target uplink data transmission into an information field in the target downlink control signaling shown in FIG. 6C, and the downlink HARQ feedback information is sent to UE 1, UE 2, and UE 3 through control region, Dc, in a transmission unit carrying the target downlink control signaling.

In the present disclosure, the base station can send downlink HARQ feedback information for a plurality of terminals in a unified manner via one piece of target downlink control signaling, which, compared with related technologies, can avoid using multiple scheduling signaling for different terminals to send pieces of downlink HARQ feedback information, and save system signaling overhead. In an unlicensed frequency band where channel resources are unpredictable, using the method of transmitting HARQ feedback information can improve reliability of HARQ feedback information transmission.

Correspondingly, the present disclosure also provides a method of transmitting downlink HARQ feedback information. The method may be applicable to a terminal in a 5G NR system.

Figure 8:
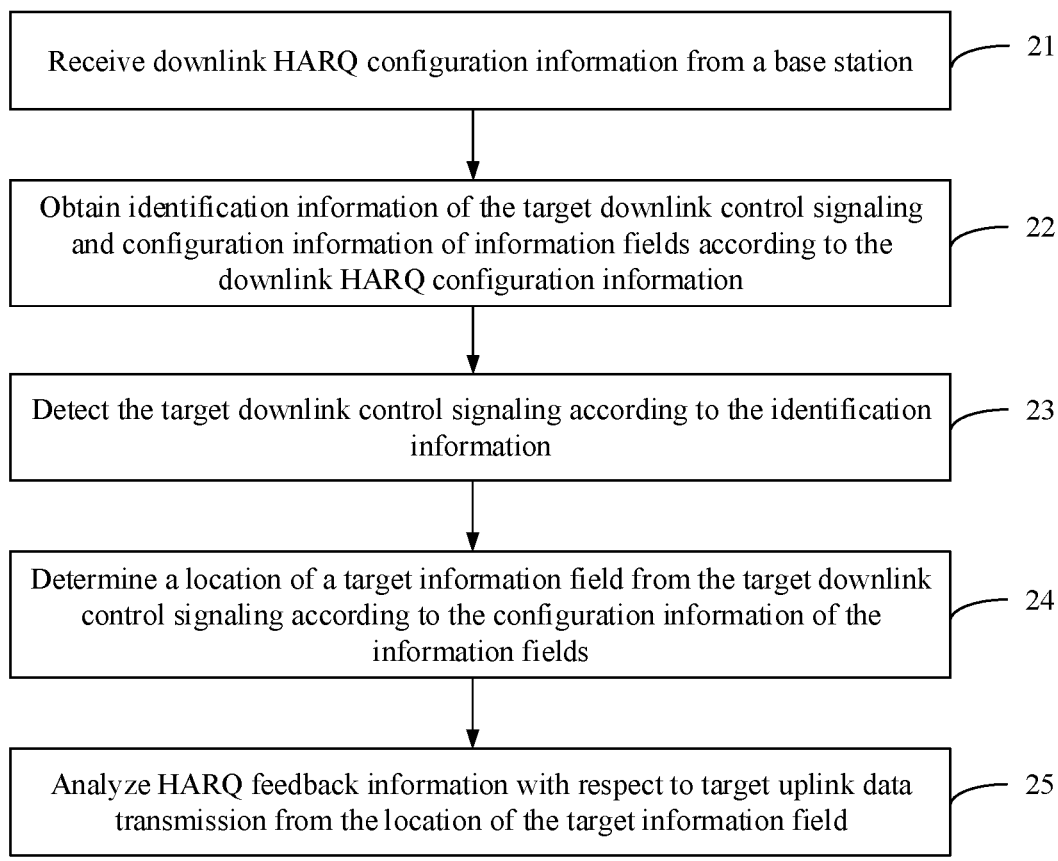
FIG. 8 is a flowchart illustrating a method of transmitting HARQ feedback information according to an example of the present disclosure.

Referring to FIG. 8, which is a flowchart illustrating a method of transmitting HARQ feedback information according to an example, the method may include the following.

At step 21, downlink HARQ configuration information from a base station is received. The downlink HARQ configuration information is used to inform a terminal about transmission configuration information of target downlink control signaling. The target downlink control signaling is used to carry pieces of downlink HARQ feedback information for at least two preset terminals. A piece of the downlink HARQ feedback information is HARQ feedback information with respect to uplink data transmission from a terminal.

At step 22, identification information of the target downlink control signaling and configuration information of information fields are obtained according to the downlink HARQ configuration information.

At step 23, the target downlink control signaling is detected according to the identification information.

The preset terminal detects the target downlink control signaling carrying downlink HARQ feedback information at a preset time/frequency location of a transmission unit according to the obtained identification information of the target downlink control signaling, for example, a preset HARQ-RNTI value.

At step 24, a location of a target information field is determined from the target downlink control signaling according to the configuration information of the information fields.

As shown in FIGS. 6A to 6C, the configuration information of the information fields indicates a location of a target information field for each UE in the target downlink control signaling, and the location indicates information lengths of corresponding information fields and a decoding ranking (or a decoding order) of the target information field in the target downlink control signaling. Therefore, each preset terminal may accurately locate its own target information field according to the configuration information of the information fields.

At step 25, HARQ feedback information with respect to target uplink data transmission is obtained by analyzing from the location of the target information field.

After the preset terminal determines the location of its own target information field, downlink HARQ feedback information with respect to the target uplink data transmission can be obtained from the location of the target information field. For example, in the example shown in FIG. 6C, UE 1 determines that its target information field location is the first 5 bits, for example, the $0^{th}$ to $4^{th}$ bits, in the current target downlink control signaling according to the configuration information of the information fields. The UE 1 can analyze its own downlink HARQ feedback information from the 5 bits.

Figure 9:
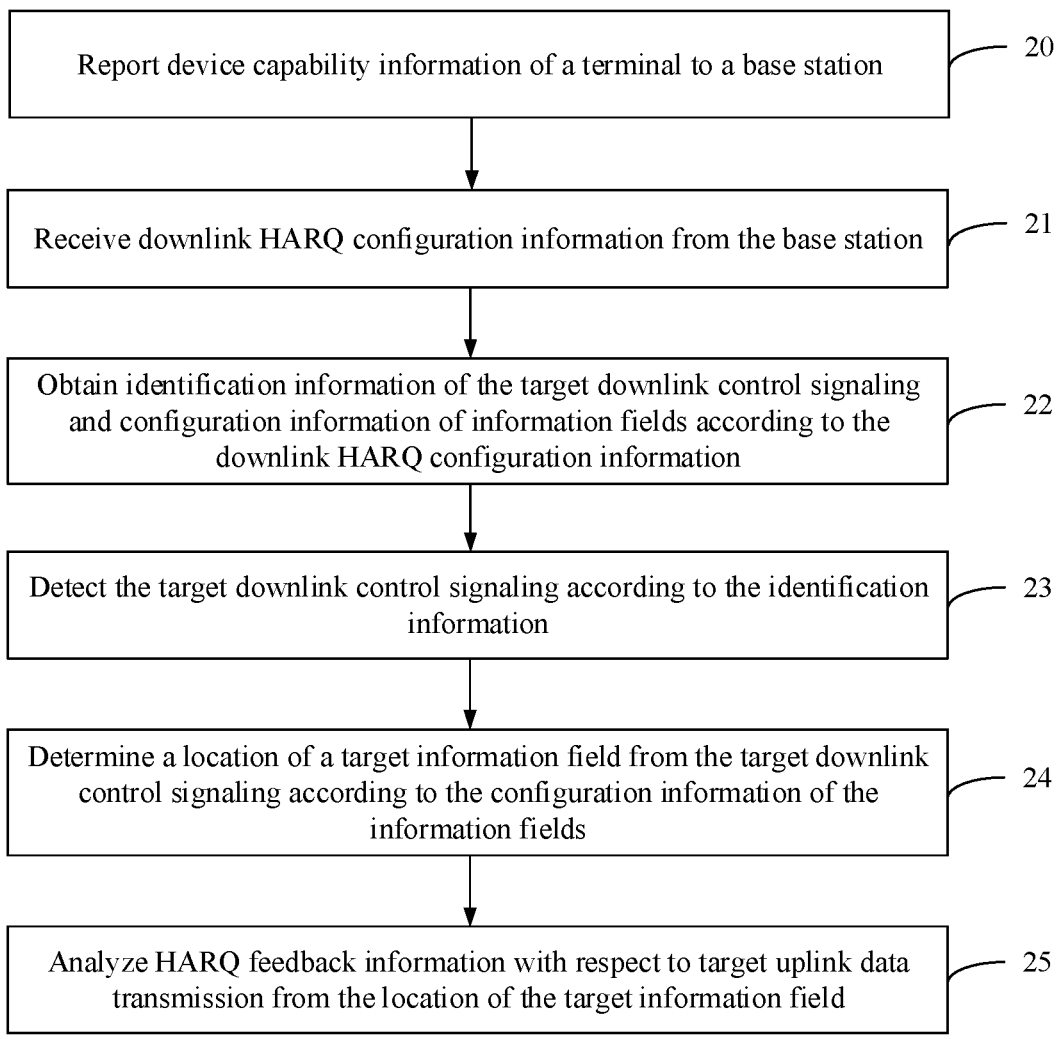
FIG. 9 is a flowchart illustrating another method of transmitting HARQ feedback information according to an example of the present disclosure.

Referring to FIG. 9, which is a flowchart illustrating another method of transmitting HARQ feedback information according to an example, before the step 21, the method may further include the following.

At step 20, device capability information of the terminal is reported to the base station. The device capability information includes information on support capability of the terminal for an HARQ feedback process, such that the base station determines an information length of the target information field according to the device capability information of the terminal.

With regard to the method examples, for the sake of simple description, all of them are expressed as a series of action combinations, but those skilled in the art should know that the present disclosure is not limited by the described sequence of actions, because according to the present disclosure, some steps may be performed in other orders or simultaneously.

Moreover, those skilled in the art should know that examples described in the specification are optional, and actions and modules involved are not necessarily required by the present disclosure.

Corresponding to the application function realization method examples, the present disclosure also provides application function realization apparatus examples and corresponding terminal examples.

Figure 10:
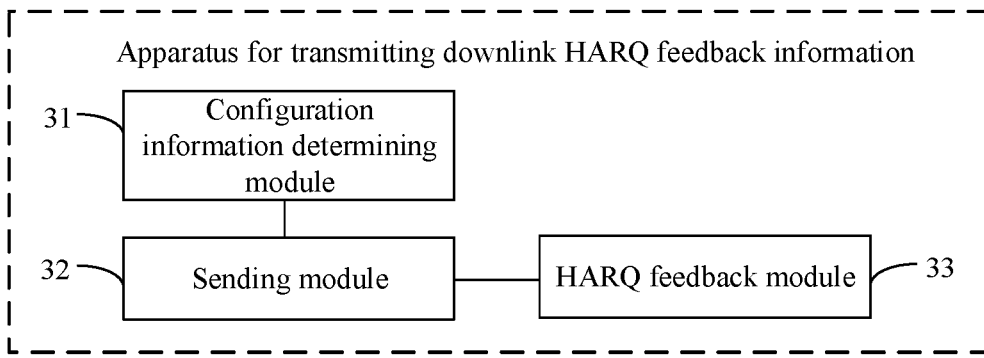
FIG. 10 is a block diagram illustrating an apparatus for transmitting HARQ feedback information according to an example of the present disclosure.

Referring to FIG. 10, which is a block diagram illustrating an apparatus for transmitting HARQ feedback information according to an example, the apparatus is set in a base station, and includes the following.

A configuration information determining module 31 is configured to determine downlink HARQ configuration information, where the downlink HARQ configuration information informs at least two preset terminals about transmission configuration information of target downlink control signaling, the target downlink control signaling carries pieces of downlink HARQ feedback information for the at least two preset terminals, and a piece of the downlink HARQ feedback information is HARQ feedback information with respect to uplink data transmission from a terminal.

In an example, the downlink HARQ configuration information includes identification information of the target downlink control signaling and configuration information of information fields.

The identification information of the target downlink control signaling informs the preset terminals about how to identify the target downlink control signaling.

The configuration information of the information fields instructs the preset terminals to search for corresponding target information fields from preset locations in the target downlink control signaling.

In another example of the present disclosure, the downlink HARQ configuration information may further include: detecting a preset CCE aggregation level of the target downlink control signaling.

A sending module 32 is configured to send the downlink HARQ configuration information to each of the preset terminals.

An HARQ feedback module 33 is configured to the downlink HARQ feedback information for each of the preset terminals into the target downlink control signaling according to the downlink HARQ configuration information, and the target downlink control signaling to each of the preset terminals.

Figure 11:
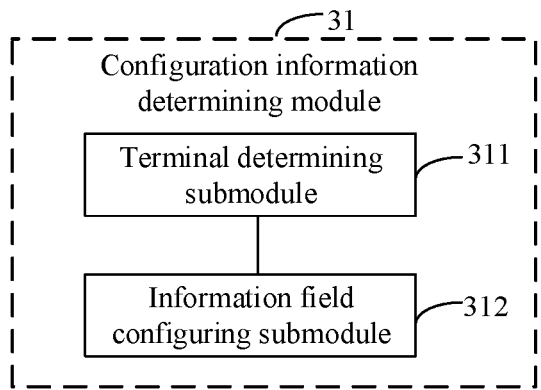
FIG. 11 is a block diagram illustrating another apparatus for transmitting HARQ feedback information according to an example of the present disclosure.

Referring to FIG. 11, which is a block diagram illustrating another apparatus for transmitting HARQ feedback information according to an example, based on the apparatus example shown in FIG. 10, the configuration information determining module 31 may include the following.

A terminal determining submodule 311 is configured to determine terminal information corresponding to the target downlink control signaling, where the terminal information includes at least a terminal identifier of each of the preset terminals.

An information field configuring submodule 312 is configured to determine configuration information of an information field for each of the preset terminals according to the terminal information.

Figure 12:
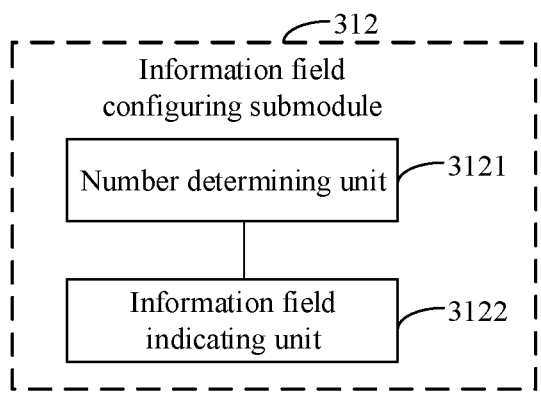
FIG. 12 is a block diagram illustrating another apparatus for transmitting HARQ feedback information according to an example of the present disclosure.

Referring to FIG. 12, which is a block diagram illustrating another apparatus for transmitting HARQ feedback information according to an example, based on the apparatus example shown in FIG. 11, the information field configuring submodule 312 may include the following.

A number determining unit 3121 is configured to determine a number of information fields in the target downlink control signaling according to the terminal information.

An information field indicating unit 3122 is configured to determine indication information of the information fields for the preset terminals according to the number of information fields.

Figure 13:
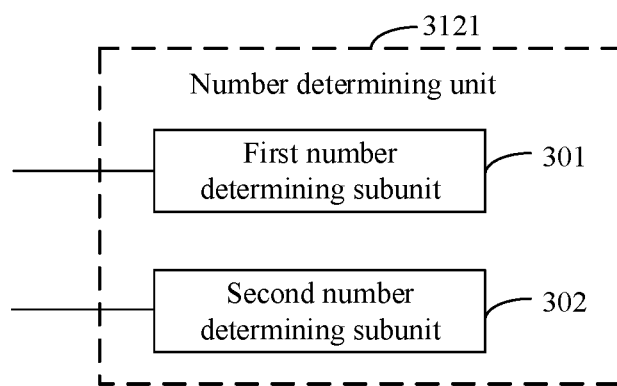
FIG. 13 is a block diagram illustrating another apparatus for transmitting HARQ feedback information according to an example of the present disclosure.

Referring to FIG. 13, which is a block diagram illustrating another apparatus for transmitting HARQ feedback information according to an example, based on the apparatus example shown in FIG. 12, the number determining unit 3121 may include: a first number determining subunit 301 or a second number determining subunit 302.

The first number determining subunit 301 is configured to configure a corresponding information field for each terminal identifier and determine the number of information fields.

The second number determining subunit 302 is configured to determine the number of information fields according to the terminal identifier of each of the preset terminals and target uplink data transmission associated with HARQ feedback to be sent currently.

Figure 14:
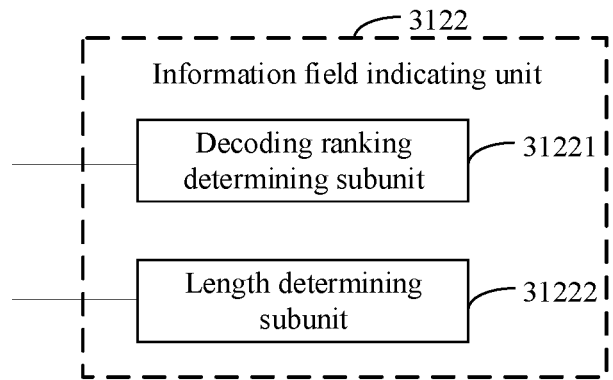
FIG. 14 is a block diagram illustrating another apparatus for transmitting HARQ feedback information according to an example of the present disclosure.

Referring to FIG. 14, which is a block diagram illustrating another apparatus for transmitting HARQ feedback information according to an example, based on the apparatus example shown in FIG. 12, the information field indicating unit 3122 may include the following.

A decoding ranking determining subunit 31221 is configured to determine, according to the number of information fields and the terminal identifiers, a decoding ranking of an information field configured for each of the preset terminals in the target downlink control signaling.

In an apparatus example of the present disclosure, the decoding ranking determining subunit 31221 may be configured to:
  determine a decoding ranking of each of the information fields in the target downlink control signaling according to a device type of each of the preset terminals; or
  determine a decoding ranking of each of the information fields in the target downlink control signaling according to a service type of uplink data transmission not associated with HARQ feedback to be sent.

A length determining subunit 31222 is configured to determine an information length of each of the information fields.

In an apparatus example of the present disclosure, the length determining subunit 31222 may be configured to perform any one of the following acts:

configuring an identical information length for each of the information fields;

determining lengths of the information fields configured for the preset terminals according to device capability information of the preset terminals, where the device capability information includes information on support capability of a preset terminal for an HARQ feedback process; or dynamically determining the lengths of the information fields configured for the preset terminals according to a number of pieces of target uplink data transmission from each of the preset terminals, where the target uplink data transmission is associated with HARQ feedback to be sent in current target downlink control signaling.

Figure 15:
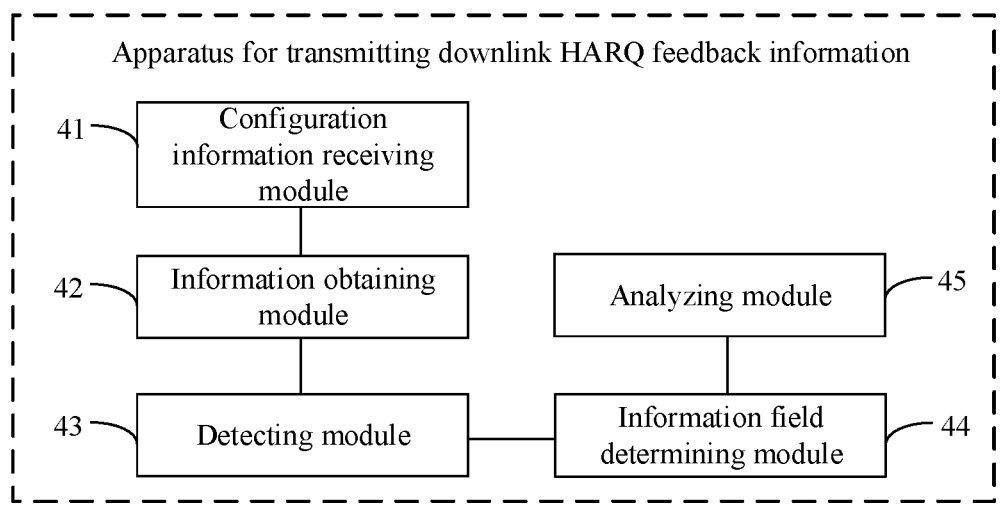
FIG. 15 is a block diagram illustrating an apparatus for transmitting HARQ feedback information according to an example of the present disclosure.

Correspondingly, the present disclosure also provides an apparatus for transmitting HARQ feedback information, and the apparatus is disposed in a terminal. Referring to FIG. 15, which is a block diagram illustrating an apparatus for transmitting HARQ feedback information according to an example, the apparatus may include the following.

A configuration information receiving module 41 is configured to receive downlink HARQ configuration information from a base station, where the downlink HARQ configuration information informs the terminal about transmission configuration information of target downlink control signaling, the target downlink control signaling carries pieces of downlink HARQ feedback information for at least two preset terminals, and a piece of the downlink HARQ feedback information is HARQ feedback information with respect to uplink data transmission from a terminal.

An information obtaining module 42 is configured to obtain identification information of the target downlink control signaling and configuration information of information fields according to the downlink HARQ configuration information.

A detecting module 43 is configured to detect the target downlink control signaling according to the identification information.

An information field determining module 44 is configured to determine a location of a target information field from the target downlink control signaling according to the configuration information of the information fields.

An analyzing module 45 is configured to obtain HARQ feedback information with respect to target uplink data transmission from the location of the target information field.

Figure 16:
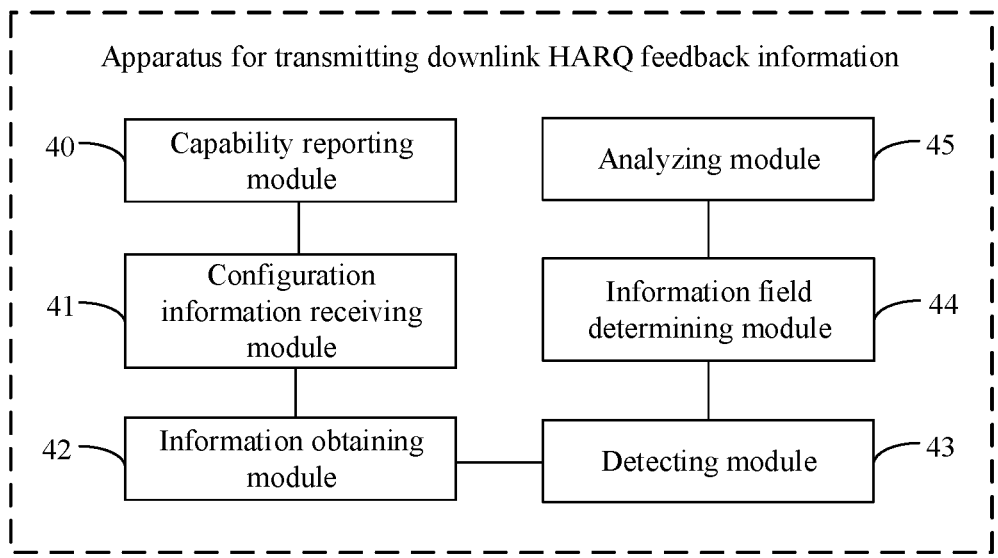
FIG. 16 is a block diagram illustrating another apparatus for transmitting HARQ feedback information according to an example of the present disclosure.

Referring to FIG. 16, which is a block diagram illustrating an apparatus for transmitting HARQ feedback information according to an example, based on the apparatus example shown in FIG. 15, the apparatus may further include the following.

A capability reporting module 40 is configured to report device capability information of the terminal to the base station, where the device capability information includes information on support capability of the terminal for an HARQ feedback process, such that the base station determines a length of the target information field according to the device capability information of the terminal.

For the apparatus examples, since they basically correspond to the method examples, reference may be made to the partial description of the method examples. The apparatus examples described above are merely illustrative, where the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement the present disclosure without any creative effort.

Correspondingly, in one aspect, a base station is provided, including:

a processor, and a memory for storing instructions executable by the processor, where the processor is configured to:

determine downlink HARQ configuration information, where the downlink HARQ configuration information informs at least two preset terminals about transmission configuration information of target downlink control signaling, the target downlink control signaling carries pieces of downlink HARQ feedback information for the at least two preset terminals, and a piece of the downlink HARQ feedback information is HARQ feedback information with respect to uplink data transmission from a terminal;

send the downlink HARQ configuration information to each of the preset terminals; and load the downlink HARQ feedback information for each of the preset terminals into the target downlink control signaling according to the downlink HARQ configuration information, and send the target downlink control signaling to each of the preset terminals.

In another aspect, a terminal is provided, including:

a processor, and a memory for storing instructions executable by the processor, where the processor is configured to:

receive downlink HARQ configuration information from a base station, where the downlink HARQ configuration information informs the terminal about transmission configuration information of target downlink control signaling, the target downlink control signaling carries pieces of downlink HARQ feedback information for at least two preset terminals, and a piece of the downlink HARQ feedback information is HARQ feedback information with respect to uplink data transmission from a terminal;

obtain identification information of the target downlink control signaling and configuration information of information fields according to the downlink HARQ configuration information;

detect the target downlink control signaling according to the identification information;

determine a location of a target information field from the target downlink control signaling according to the configuration information of the information fields; and obtain HARQ feedback information with respect to target uplink data transmission from the location of the target information field.

Figure 17:
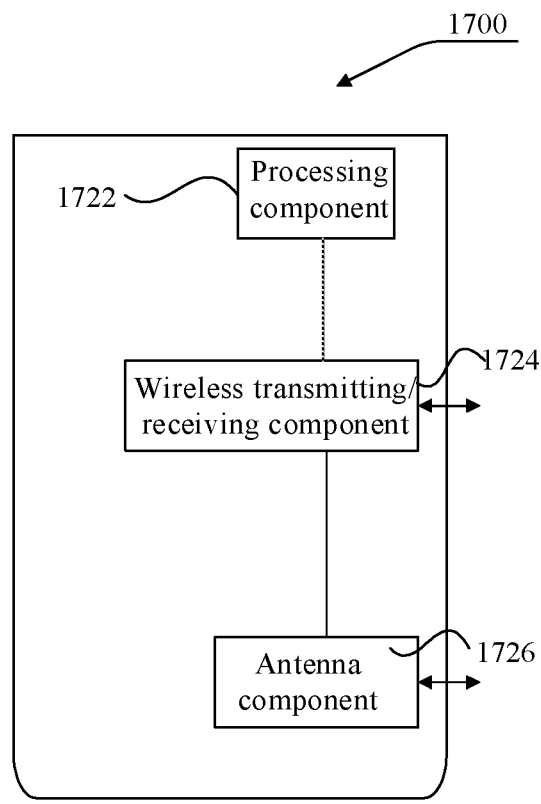
FIG. 17 is a structural schematic diagram illustrating a base station according to an example of the present disclosure.

FIG. 17 is a structural schematic diagram illustrating a base station 1700 according to an example. Referring to FIG. 17, the base station 1700 includes a processing component 1722, a wireless transmitting/receiving component 1724, an antenna component 1726, and a signal processing portion specific to a wireless interface. The processing component 1722 may further include one or more processors.

One of the processors in the processing component 1722 may be configured to:

determine downlink HARQ configuration information, where the downlink HARQ configuration information informs at least two preset terminals about transmission configuration information of target downlink control signaling, the target downlink control signaling carries pieces of downlink HARQ feedback information for the at least two preset terminals, and a piece of the downlink HARQ feedback information is HARQ feedback information with respect to uplink data transmission from a terminal;

send the downlink HARQ configuration information to each of the preset terminals; and load the downlink HARQ feedback information for each of the preset terminals into the target downlink control signaling according to the downlink HARQ configuration information, and send the target downlink control signaling to each of the preset terminals.

In an example, there is also provided a non-transitory computer readable storage medium having computer instructions stored thereon, where the computer instructions are executable by the processing component 1722 of the base station 1700 to implement the method of transmitting HARQ feedback information as described in any one of FIGS. 1 to 7. For example, the non-transitory computer readable storage medium may be a read only memory (ROM), a random access memory (RAM), a CD-ROM, a magnetic tape, a floppy disk, and an optical data storage device.

Figure 18:
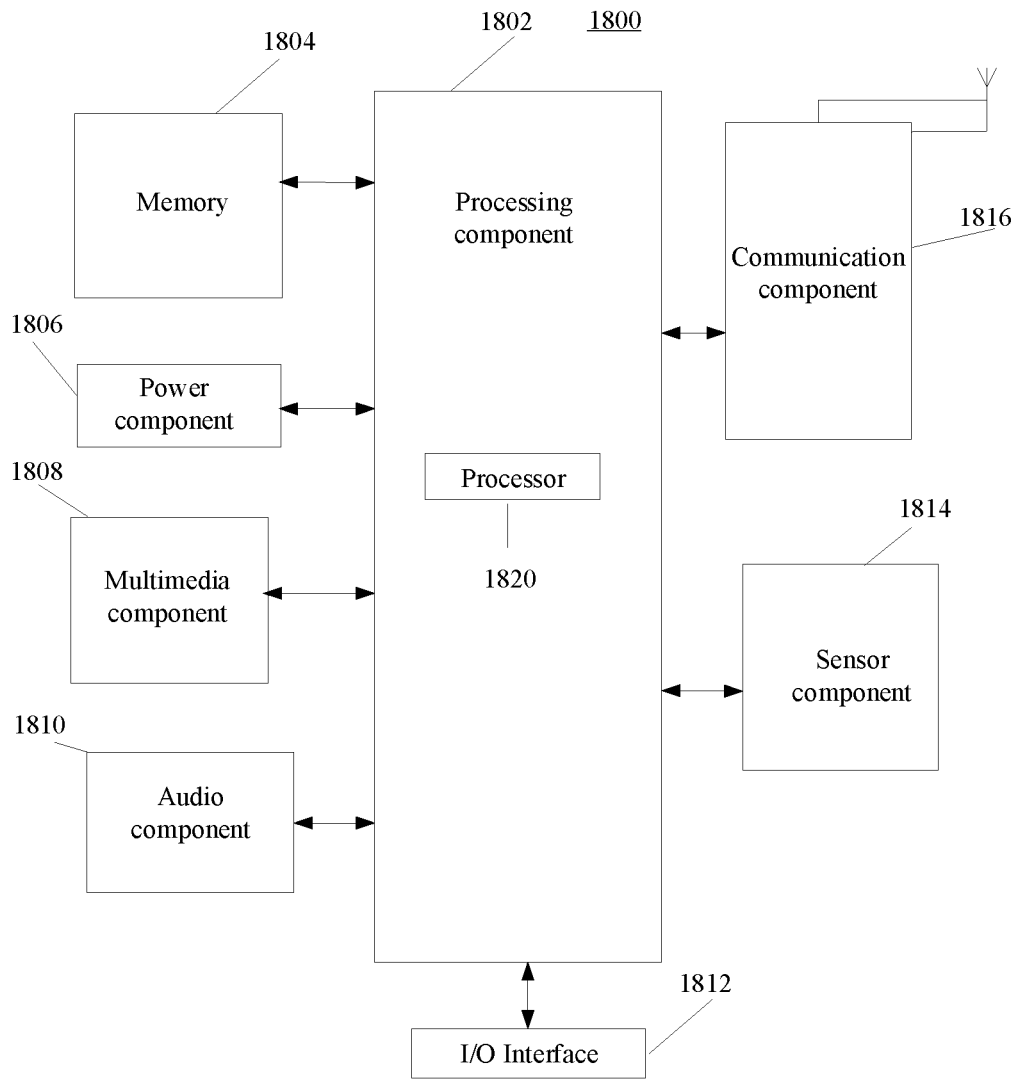
FIG. 18 is a structural schematic diagram illustrating a terminal according to an example of the present disclosure.

FIG. 18 is a structural schematic diagram illustrating user equipment 1800 according to an example. For example, the user equipment 1800 may be a terminal, and may specifically be a mobile phone, a computer, a digital broadcast terminal, a messaging device, a game console, a tablet device, a medical equipment, a fitness equipment, a personal digital assistant, a wearable device such as a smart watch, smart glasses, smart bracelets, smart running shoes, etc.

Referring to FIG. 18, the user equipment 1800 may include one or more of the following components: a processing component 1802, a memory 1804, a power component 1806, a multimedia component 1808, an audio component 1810, an input/output (I/O) interface 1812, a sensor component 1814, and a communication component 1816.

The processing component 1802 usually controls the overall operation of the user equipment 1800, such as operations associated with display, telephone calls, data communications, camera operations, and recording operations. The processing component 1802 may include one or more processors 1820 to execute instructions to perform all or part of the steps in the methods described above. Moreover, the processing component 1802 may include one or more modules to facilitate interaction between the processing component 1802 and other components. For example, the processing component 1802 may include a multimedia module to facilitate interaction between the multimedia component 1808 and the processing component 1802.

The memory 1804 is configured to store various types of data to support operation at the user equipment 1800. Examples of these data include instructions for any application or method operating at the user equipment 1800, contact data, phone book data, messages, pictures, videos, and the like. The memory 1804 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a ROM, a magnetic memory, a flash memory, a disk or a compact disk.

The power component 1806 provides power to various components of the user equipment 1800. The power component 1806 may include a power management system, one or more power sources, and other components associated with power generated, managed, and distributed for the user equipment 1800.

The multimedia component 1808 includes a screen that provides an output interface between the user equipment 1800 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1808 includes a front camera and/or a rear camera. When the user equipment 1800 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1810 is configured to output and/or input audio signals. For example, the audio component 1810 includes a microphone (MIC) configured to receive an external audio signal when the user equipment 1800 is in an operation mode, such as a call mode, a recording mode, and a voice recognition mode. The received audio signal may be further stored in the memory 1804 or transmitted via the communication component 1816. In some examples, the audio component 1810 also includes a loudspeaker for outputting an audio signal.

The I/O interface 1812 provides an interface between the processing component 1802 and a peripheral interface module which may be a keyboard, a click wheel, a button, or the like. These buttons may include, but are not limited to a home button, a volume button, a start button, and a lock button.

The sensor component 1814 includes one or more sensors for providing a status assessment in various aspects to the user equipment 1800. For example, the sensor component 1814 may detect an open/closed state of the user equipment 1800, and the relative positioning of components, for example, the component is a display and a keypad of the user equipment 1800. The sensor component 1814 may also detect a change in position of the user equipment 1800 or a component of the user equipment 1800, the presence or absence of a user in contact with the user equipment 1800, the orientation or acceleration/deceleration of the user equipment 1800 and a change in temperature of the user equipment 1800. The sensor component 1814 may include a proximity sensor configured to detect the presence of nearby objects without any physical contact. The sensor component 1814 may also include a light sensor, such as a CMOS or CCD image sensor, for use in imaging applications. In some examples, the sensor component 1814 may also include an acceleration sensor, a gyro sensor, a magnetic sensor, a pressure sensor, or a temperature sensor.

The communication component 1816 is configured to facilitate wired or wireless communication between the user equipment 1800 and other devices. The user equipment 1800 may access a wireless network based on a communication standard, such as WiFi, 2G, 3G, 4G LTE, 5G NR or a combination thereof. In an example, the communication component 1816 receives broadcast signals or broadcast associated information from an external broadcast management system via a broadcast channel. In an example, the communication component 1816 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the user equipment 1800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for performing the above methods.

In an example, there is also provided a non-transitory computer readable storage medium including instructions, such as a memory 1804 including instructions, where the instructions are executable by the processor 1820 of the user equipment 1800 to implement the method of transmitting HARQ feedback information as described in FIG. 8 or FIG. 9. For example, the non-transitory computer readable storage medium may be a ROM, a RAM, a CD-ROM, a magnetic tape, a floppy disk, and an optical data storage device.

Optionally, the downlink HARQ configuration information includes: identification information of the target downlink control signaling and configuration information of information fields
- the identification information of the target downlink control signaling informs the preset terminals about how to identify the target downlink control signaling; and
- the configuration information of the information fields instructs the preset terminals to search for corresponding target information fields from preset locations in the target downlink control signaling.

Optionally, determining the downlink HARQ configuration information includes:
- determining terminal information corresponding to the target downlink control signaling, where the terminal information includes at least a terminal identifier of each of the preset terminals; and
- determining configuration information of an information field for each of the preset terminals according to the terminal information.

Optionally, determining the configuration information of the information field for each of the preset terminals according to the terminal information includes:
- determining a number of information fields in the target downlink control signaling according to the terminal information; and
- determining indication information of the information fields for the preset terminals according to the number of information fields.

Optionally, determining the number of information fields in the target downlink control signaling according to the terminal information includes:
- configuring a corresponding information field for each terminal identifier and determining the number of information fields; or
- determining the number of information fields according to the terminal identifier of each of the preset terminals and target uplink data transmission associated with HARQ feedback to be sent currently.

Optionally, determining the indication information of the information fields for the preset terminals according to the number of information fields includes:
- determining, according to the number of information fields and the terminal identifiers, a decoding ranking of an information field configured for each of the preset terminals in the target downlink control signaling; and
- determining an information length of each of the information fields.

Optionally, determining the decoding ranking of the information field configured for each of the preset terminals in the target downlink control signaling includes at least one of the following:
- determining a decoding ranking of each of the information fields in the target downlink control signaling according to a device type of each of the preset terminals; or
- determining a decoding ranking of each of the information fields in the target downlink control signaling according to a service type of uplink data transmission not associated with HARQ feedback to be sent.

Optionally, determining the information length of each of the information fields includes any one of the following:
- configuring an identical information length for each of the information fields;
- determining lengths of the information fields configured for the preset terminals according to device capability information of the preset terminals, where the device capability information includes information on support capability of a preset terminal for an HARQ feedback process; or
- dynamically determining the lengths of the information fields configured for the preset terminals according to a number of pieces of target uplink data transmission from each of the preset terminals, where the target uplink data transmission is associated with HARQ feedback to be sent in current target downlink control signaling.

Optionally, the downlink HARQ configuration information further includes: detecting a preset Control Channel Element (CCE) aggregation level of the target downlink control signaling.

Optionally, before receiving the downlink HARQ configuration information from the base station, the method further includes:
- reporting device capability information of the terminal to the base station, where the device capability information includes information on support capability of the terminal for an HARQ feedback process, such that the base station determines a length of the target information field according to the device capability information of the terminal.

Optionally, the downlink HARQ configuration information includes: identification information of the target downlink control signaling and configuration information of information fields;
- the identification information of the target downlink control signaling informs the preset terminals about how to identify the target downlink control signaling; and
- the configuration information of the information fields instructs the preset terminals to search for corresponding target information fields from preset locations in the target downlink control signaling.

Optionally, the configuration information determining module includes:
- a terminal determining submodule configured to determine terminal information corresponding to the target downlink control signaling, where the terminal information includes at least a terminal identifier of each of the preset terminals; and an information field configuring submodule configured to determine configuration information of an information field for each of the preset terminals according to the terminal information.

Optionally, the information field configuring submodule includes:
a number determining unit configured to determine a number of information fields in the target downlink control signaling according to the terminal information; and
an information field indicating unit configured to determine indication information of the information fields for the preset terminals according to the number of information fields.

Optionally, the number determining unit includes:
a first number determining subunit configured to configure a corresponding information field for each terminal identifier and determine the number of information fields; or
a second number determining subunit configured to determine the number of information fields according to the terminal identifier of each of the preset terminals and target uplink data transmission associated with HARQ feedback to be sent currently.

Optionally, the information field indicating unit includes:
a decoding ranking determining subunit configured to determine, according to the number of information fields and the terminal identifiers, a decoding ranking of an information field configured for each of the preset terminals in the target downlink control signaling; and
a length determining subunit configured to determine an information length of each of the information fields.

Optionally, the decoding ranking determining subunit is configured to:
determine a decoding ranking of each of the information fields in the target downlink control signaling according to a device type of each of the preset terminals; or
determine a decoding ranking of each of the information fields in the target downlink control signaling according to a service type of uplink data transmission not associated with HARQ feedback to be sent.

Optionally, the length determining subunit is configured to perform any one of the following:
configuring an identical information length for each of the information fields;
determining lengths of the information fields configured for the preset terminals according to device capability information of the preset terminals, where the device capability information includes information on support capability of a preset terminal for an HARQ feedback process; or
dynamically determining the lengths of the information fields configured for the preset terminals according to a number of pieces of target uplink data transmission from each of the preset terminals, where the target uplink data transmission is associated with HARQ feedback to be sent in current target downlink control signaling.

Optionally, the downlink HARQ configuration information further includes: detecting a preset Control Channel Element (CCE) aggregation level of the target downlink control signaling.

Optionally, the apparatus further includes: a capability reporting module configured to report device capability information of the terminal to the base station, where the device capability information includes information on support capability of the terminal for an HARQ feedback process, such that the base station determines a length of the target information field according to the device capability information of the terminal.

The technical solutions provided by the examples of the present disclosure may include the following beneficial effects.

In the present disclosure, a base station can send downlink HARQ feedback information for a plurality of terminals in a unified manner via one piece of target downlink control signaling, which, compared with related technologies, can avoid using multiple scheduling signaling for different terminals to send pieces of downlink HARQ feedback information, save system signaling overhead, and improve flexibility of an HARQ feedback mechanism in a 5G NR system. In an unlicensed frequency band where channel resources are unpredictable, using the method of transmitting HARQ feedback information can improve reliability of HARQ feedback information transmission.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

What is claimed is:
1. A method of transmitting downlink Hybrid Automatic Repeat reQuest (HARQ) feedback information, being applicable to a base station, and comprising:
determining downlink HARQ configuration information, wherein the downlink HARQ configuration information informs at least two preset terminals about transmission configuration information of target downlink control signaling, the target downlink control signaling carries pieces of downlink HARQ feedback information for the at least two preset terminals, and a piece of the downlink HARQ feedback information is HARQ feedback information with respect to uplink data transmission from a terminal;
sending the downlink HARQ configuration information to each of the at least two preset terminals;
loading the downlink HARQ feedback information for each of the at least two preset terminals into the target downlink control signaling according to the downlink HARQ configuration information; and
sending the target downlink control signaling to each of the at least two preset terminals,
wherein the downlink HARQ configuration information comprises identification information of the target downlink control signaling and configuration information of information fields;
wherein the identification information of the target downlink control signaling informs the at least two preset terminals about how to identify the target downlink control signaling; and
wherein the configuration information of the information fields instructs the at least two preset terminals to search for corresponding target information fields from preset locations in the target downlink control signaling;

wherein determining the downlink HARQ configuration information comprises:

determining terminal information corresponding to the target downlink control signaling, wherein the terminal information comprises at least a terminal identifier of each of the at least two preset terminals; and determining configuration information of an information field for each of the at least two preset terminals according to the terminal information.

2. The method according to claim 1, wherein determining the configuration information of the information field for each of the at least two preset terminals according to the terminal information comprises:

determining a number of information fields in the target downlink control signaling according to the terminal information; and determining indication information of the information fields for the at least two preset terminals according to the number of information fields.

3. The method according to claim 2, wherein determining the number of information fields in the target downlink control signaling according to the terminal information comprises:

configuring a corresponding information field for each terminal identifier and determining the number of information fields; or determining the number of information fields according to the terminal identifier of each of the at least two preset terminals and target uplink data transmission associated with HARQ feedback to be sent currently.

4. The method according to claim 3, wherein determining the indication information of the information fields for the at least two preset terminals according to the number of information fields comprises:

determining, according to the number of information fields and the terminal identifiers, a decoding ranking of an information field configured for each of the at least two preset terminals in the target downlink control signaling; and determining an information length of each of the information fields.

5. The method according to claim 4, wherein determining the decoding ranking of the information field configured for each of the at least two preset terminals in the target downlink control signaling comprises at least one of the following:

determining a decoding ranking of each of the information fields in the target downlink control signaling according to a device type of each of the at least two preset terminals; or determining a decoding ranking of each of the information fields in the target downlink control signaling according to a service type of uplink data transmission associated with HARQ feedback to be sent.

6. The method according to claim 4, wherein determining the information length of each of the information fields comprises one of following acts:

configuring an identical information length for each of the information fields;

determining information lengths of the information fields configured for the at least two preset terminals according to device capability information of the at least two preset terminals, wherein the device capability information of each of the at least two preset terminals comprises information on support capability of the preset terminal for an HARQ feedback process; or dynamically determining the information lengths of the information fields configured for the at least two preset terminals according to a number of pieces of target uplink data transmission from each of the at least two preset terminals, wherein the target uplink data transmission is associated with HARQ feedback to be sent in the target downlink control signaling.

7. The method according to claim 1, wherein the downlink HARQ configuration information further comprises:

a preset Control Channel Element (CCE) aggregation level of the target downlink control signaling.

8. A base station, comprising:

a processor, and a memory for storing instructions executable by the processor, wherein the processor is configured to:

determine downlink Hybrid Automatic Repeat reQuest (HARQ) configuration information, wherein the downlink HARQ configuration information informs at least two preset terminals about transmission configuration information of target downlink control signaling, the target downlink control signaling carries pieces of downlink HARQ feedback information for the at least two preset terminals, and a piece of the downlink HARQ feedback information is HARQ feedback information with respect to uplink data transmission from a terminal;

send the downlink HARQ configuration information to each of the at least two preset terminals;

load the downlink HARQ feedback information for each of the at least two preset terminals into the target downlink control signaling according to the downlink HARQ configuration information; and send the target downlink control signaling to each of the at least two preset terminals, wherein the downlink HARQ configuration information comprises identification information of the target downlink control signaling and configuration information of information fields;

the identification information of the target downlink control signaling informs the preset terminals about how to identify the target downlink control signaling; and the configuration information of the information fields instructs the preset terminals to search for corresponding target information fields from preset locations in the target downlink control signaling;

wherein determining the downlink HARQ configuration information comprises:

determining terminal information corresponding to the target downlink control signaling, wherein the terminal information comprises at least a terminal identifier of each of the preset terminals; and determining configuration information of an information field for each of the preset terminals according to the terminal information.

9. The base station according to claim 8, wherein determining the configuration information of the information field for each of the at least two preset terminals according to the terminal information comprises:

determining a number of information fields in the target downlink control signaling according to the terminal information; and determining indication information of the information fields for the at least two preset terminals according to the number of information fields.

10. The base station according to claim 9, wherein determining the number of information fields in the target downlink control signaling according to the terminal information comprises:
 configuring a corresponding information field for each terminal identifier and determining the number of information fields; or
 determining the number of information fields according to the terminal identifier of each of the at least two preset terminals and target uplink data transmission associated with HARQ feedback to be sent currently.

11. The base station according to claim 10, wherein determining the indication information of the information fields for the at least two preset terminals according to the number of information fields comprises:
 determining, according to the number of information fields and the terminal identifiers, a decoding ranking of an information field configured for each of the at least two preset terminals in the target downlink control signaling; and
 determining an information length of each of the information fields.

12. The base station according to claim 11,
 wherein determining the decoding ranking of the information field configured for each of the at least two preset terminals in the target downlink control signaling comprises at least one of the following:
  determining a decoding ranking of each of the information fields in the target downlink control signaling according to a device type of each of the at least two preset terminals; or
  determining a decoding ranking of each of the information fields in the target downlink control signaling according to a service type of uplink data transmission associated with HARQ feedback to be sent; and
 wherein determining the information length of each of the information fields comprises one of the following acts:
  configuring an identical information length for each of the information fields;
  determining information lengths of the information fields configured for the at least two preset terminals according to device capability information of the at least two preset terminals, wherein the device capability information of each of the at least two preset terminals comprises information on support capability of the preset terminal for an HARQ feedback process; or
  dynamically determining the information lengths of the information fields configured for the at least two preset terminals according to a number of pieces of target uplink data transmission from each of the at least two preset terminals, wherein the target uplink data transmission is associated with HARQ feedback to be sent in the target downlink control signaling.

* * * * *